United States Patent
Yu et al.

(10) Patent No.: US 7,768,713 B2
(45) Date of Patent: Aug. 3, 2010

(54) LIQUID LENS AND LENS MODULE HAVING SAME

(75) Inventors: Hsiang-Chieh Yu, Taipei Hsien (TW); Yu-Chien Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/330,566

(22) Filed: Dec. 9, 2008

(65) Prior Publication Data
US 2009/0310224 A1    Dec. 17, 2009

(30) Foreign Application Priority Data
Jun. 13, 2008    (CN) .......................... 2008 1 0302133

(51) Int. Cl.
*G02B 1/06*    (2006.01)

(52) U.S. Cl. ..................................................... 359/666

(58) Field of Classification Search ................. 359/665, 359/666
See application file for complete search history.

(56) References Cited

U.S. PATENT DOCUMENTS

| | | | |
|---|---|---|---|
| 4,784,479 A * | 11/1988 | Ikemori ....................... 359/666 |
| 2005/0041301 A1* | 2/2005 | Kibayashi .................... 359/666 |

* cited by examiner

*Primary Examiner*—Joseph Martinez
(74) *Attorney, Agent, or Firm*—Clifford O. Chi (57) ABSTRACT

The present disclosure relates to a liquid lens and a lens module having the same. The liquid lens includes an enclosure, an elastic shell and a light pervious liquid. The enclosure has a top wall and defines a through opening in the top wall. The elastic shell is received in the enclosure and is filled with the light pervious liquid. The elastic shell includes an inner portion and an outer convex portion. The convex portion protrudes from the outer enclosure via the through opening.

15 Claims, 7 Drawing Sheets

LIQUID LENS AND LENS MODULE HAVING SAME

BACKGROUND

1. Technical Field

The present disclosure generally relates to lens, and particularly relates to a liquid lens and a lens module including the liquid lens.

2. Discussion of Related Art

A zoom lens module typically includes at least one lens, an image sensor and an actuator, such as a step motor for driving the lenses to move relatively to the image sensor in order to obtain a desired focal length. However, the step motor is relative large in volume, thus a significant amount of space is needed for movement of the lenses, which makes it very difficult to reduce a volume of the lens module.

Figure 7:
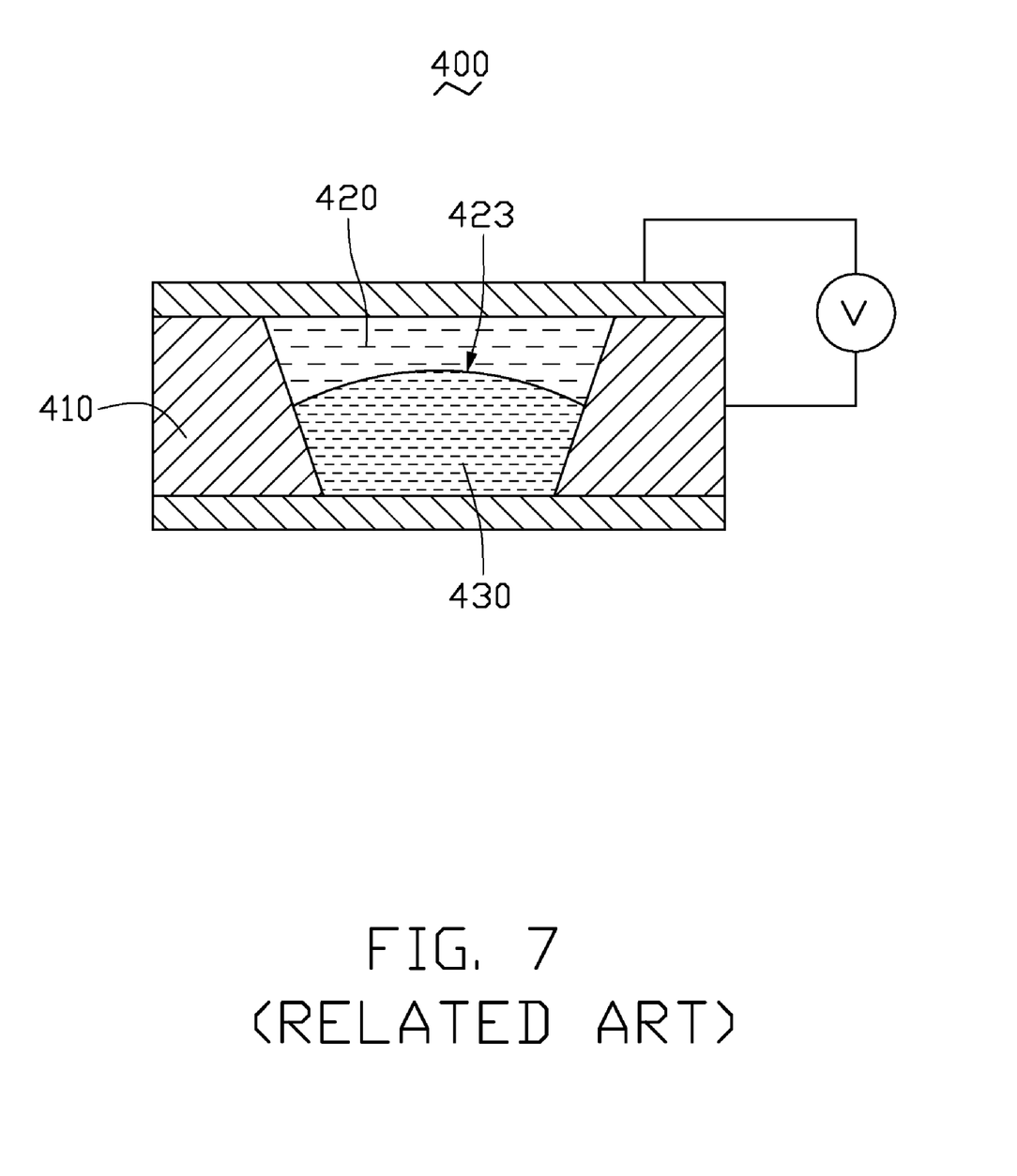
FIG. 7 is a cross-sectional view of a liquid lens in related art.

Optical systems employing liquid lenses are developed recently to meet a trend of miniaturization. As shown in FIG. 7, a typical liquid lens 400 includes an enclosure 410 which defines a receiving space (not labeled) and two types of liquids (an electrically conductive liquid 420 and an electrically insulative liquid 430) received in the receiving space. The two liquids are non-dissolved and non-wetable to each other. When applying a voltage to two electrodes (not shown) fixed on the enclosure 410, an electrowetting is produced, and a curvature of an interface 423 between the two liquid 420, 430 is varied because of the electrowetting, thus obtaining a desired focal length. However, after focusing, the voltage need be applied continuously to keep the curvature in place due to gravity influence of the electrically conductive liquid 420. Therefore, the optical system has a high power-consumption.

What is desired, therefore, is a liquid lens and a lens module having the same to overcome the above-described problems.

SUMMARY

A liquid lens comprises an enclosure, an elastic shell and a light pervious liquid is provided. The enclosure has a top wall and defines a through opening in a top wall. The elastic shell is filled with the light pervious liquid, and is received in the outer enclosure. The elastic shell comprises an inner portion and an outer convex portion. The convex portion protrudes from the outer enclosure via the through opening.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

DETAILED DESCRIPTION OF EMBODIMENTS

Figure 1:
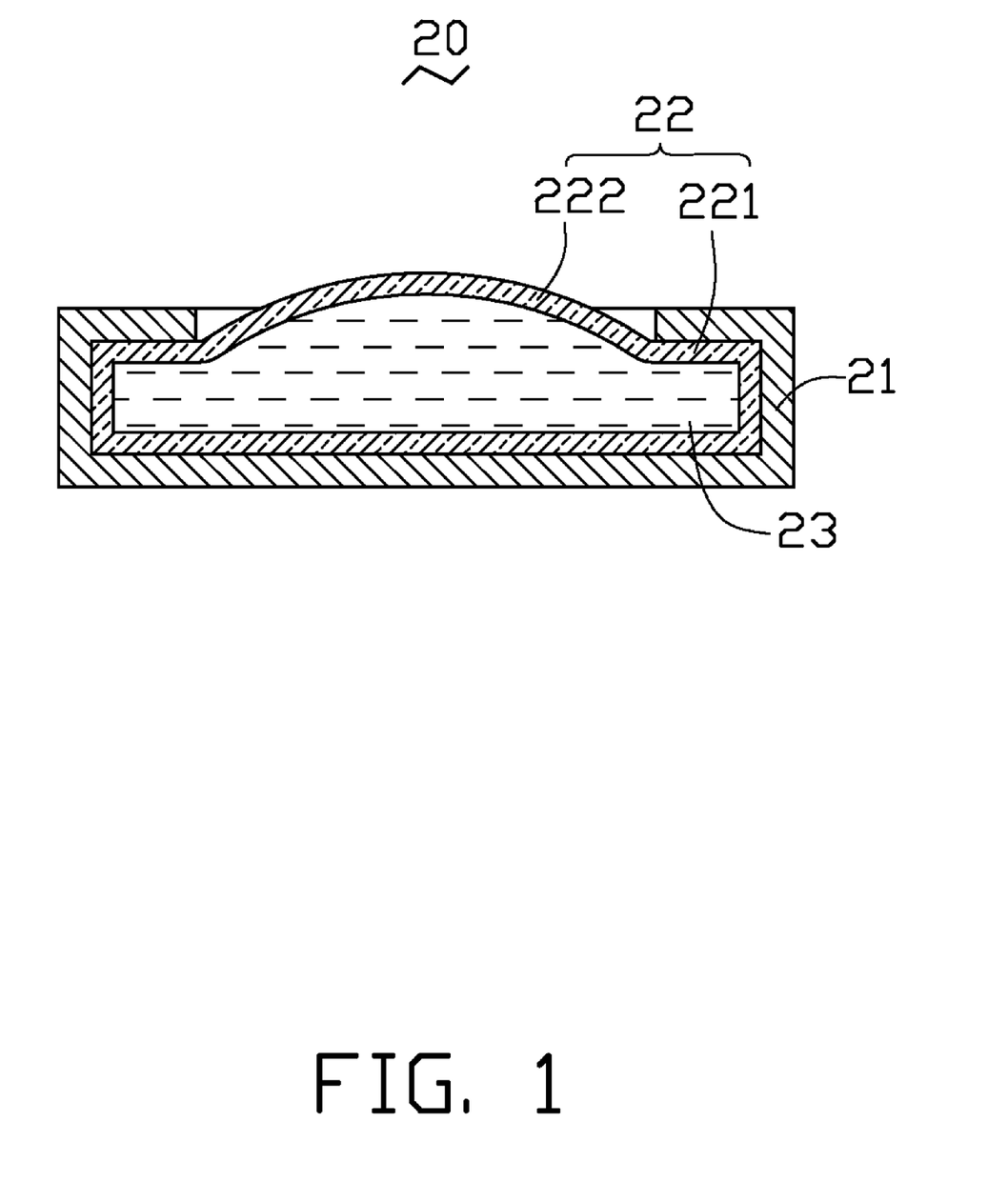
FIG. 1 is a cross-sectional view of a liquid lens including an outer enclosure, an elastic shell and a light pervious liquid according to a first embodiment.

Referring to FIG. 1, a liquid lens 20 provided in a first embodiment includes an enclosure 21, a light pervious liquid 23, and an elastic shell 22.

Figure 2:
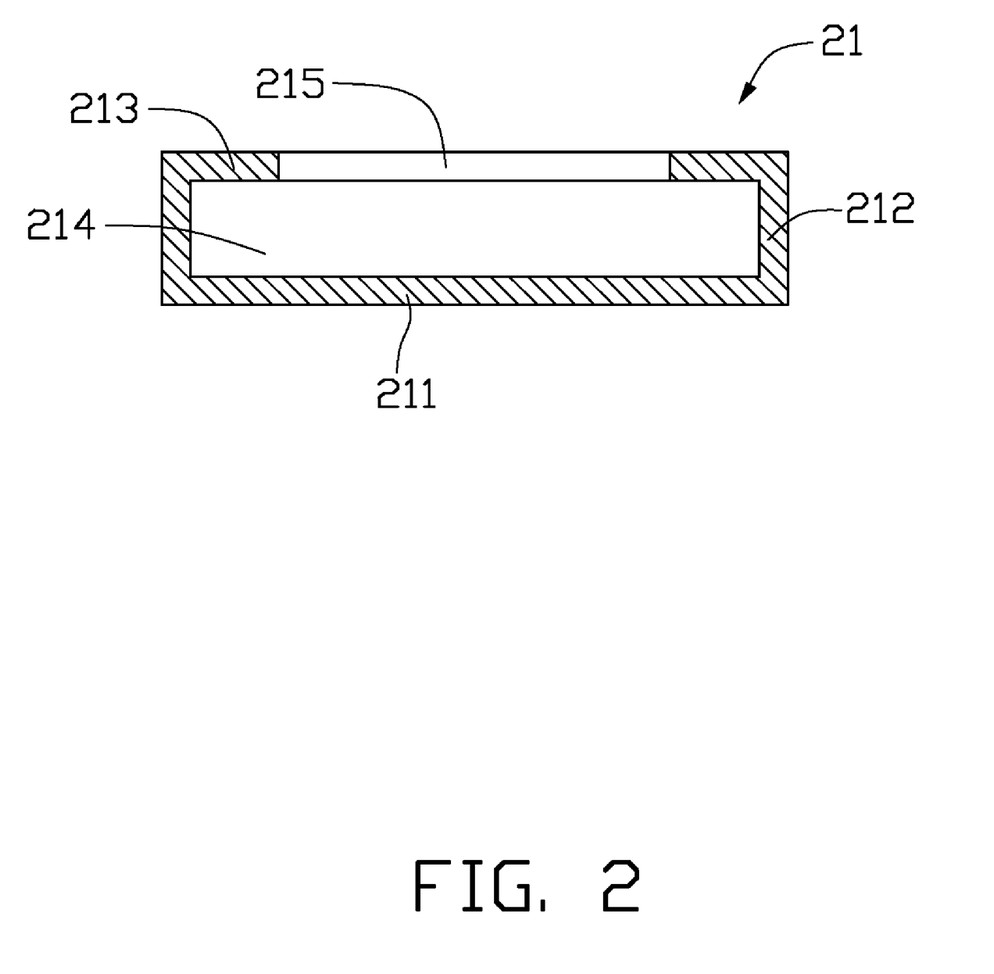
FIG. 2 is a cross-sectional view of the outer enclosure shown in FIG. 1.

Referring to FIG. 2, the enclosure 21 has a flat bottom wall 211, an opposite top wall 213 and a side wall 212 therebetween. The bottom wall 211, the top wall 213 and the side wall 212 cooperatively define a cylindrical inner space 214 for receiving a portion of the elastic shell 22. The top wall 213 defines a through opening 215 therein. As such, the inner space 214 gets in communication with atmospheres via the through opening 215. The outer enclosure 21 is made of metal oxide or hybrid metal oxide, which is light-pervious, such as indium tin oxide, zinc oxide, tin oxide, indium hybrid monoxide, tin hybrid argent indium oxide, zinc hybrid and etc.

The elastic shell 22 is filled with the light previous liquid 23. The light pervious liquid 23 is selected from the group consisting of electrically conductive liquid and an electrically insulative liquid, such as sodium chloride, sodium vitriol, silicon oil solution and bromododecane solution.

The elastic shell 22 includes an inner portion 221 and an outer arc-shaped convex portion 222, and is configured for receiving the light pervious liquid 23. The elastic shell 22 is made of transparent and elastic materials, such as silicon resin.

The inner portion 221 is in contact with an inner surfaces of the top wall 213, the side wall 212 and the bottom wall 211 due to a pressure of the light pervious liquid 23. As a volume of the light pervious liquid 23 is larger than that of the inner space 214, the light pervious liquid 23 is divided imaginarily into two portions. One portion of the light pervious liquid 23 is accommodated in the inner portion 221. Another portion of the light pervious liquid 23 is accommodated in the convex portion 222 of the elastic shell 22, and protrudes from the enclosure 21 via the through opening 215 due to a pressure given cooperatively by the top wall 213, the side wall 212 and the bottom wall 211.

When applying a force onto the outer convex portion 222, the shape of the outer convex portion 222 may varied due to elasticity and a flowing of the light pervious liquid 23. As a result, a curvature of the outer convex portion 222 is varied, and a focal length of the liquid lens 20 is changed.

Figure 3:
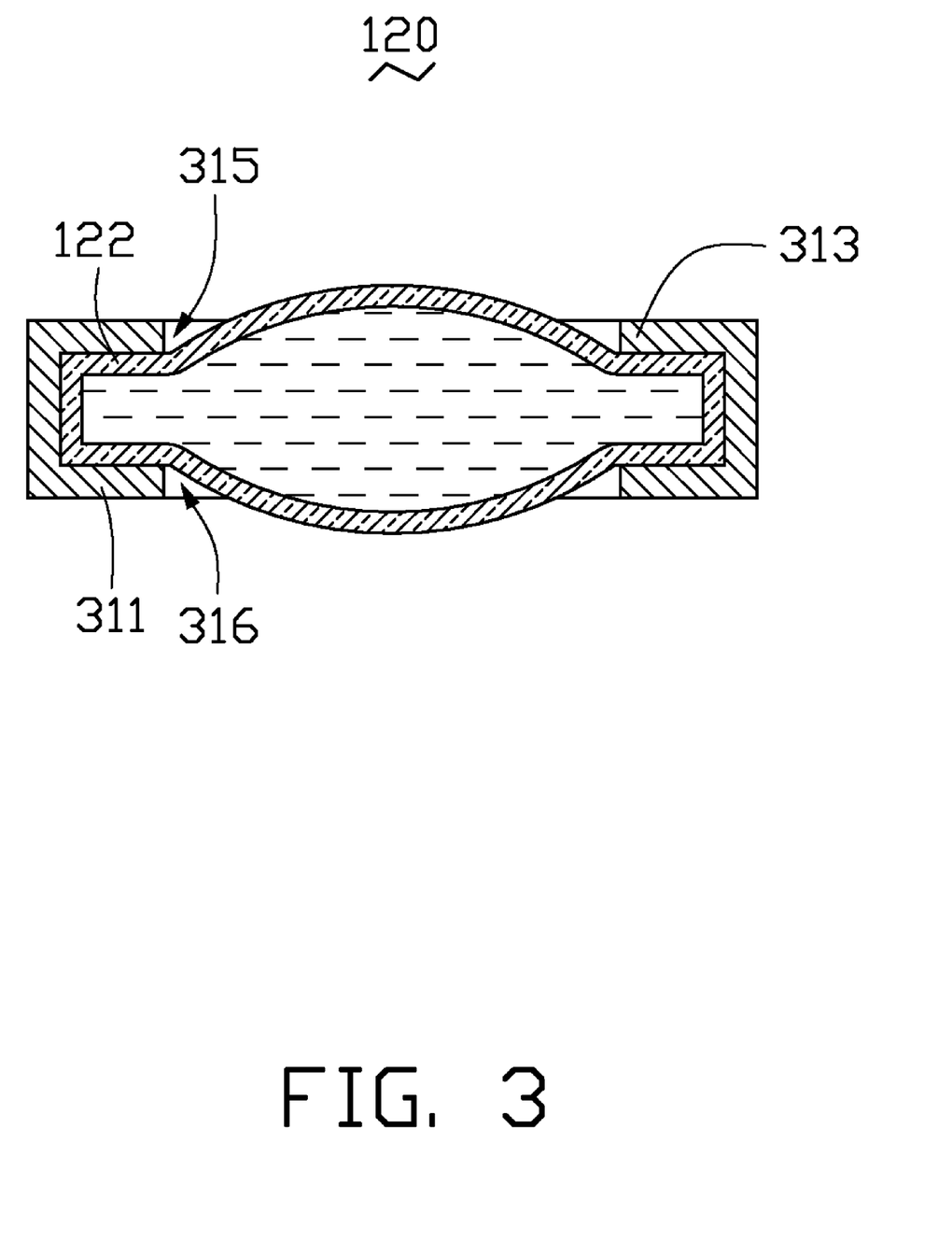
FIG. 3 is a cross-sectional view of a liquid lens in accordance with a second embodiment.

Referring to FIG. 3, a liquid lens 120 provided in a second embodiment is similar to liquid lens 20, except that the bottom wall 311 defines a through opening 316 aligned with the through opening 315 in the top wall 313. Another portion of the elastic shell 122 protrudes from the bottom wall 311 via the through opening 316, thus, the liquid lens 120 is a double-sided convex lens.

Figure 4:
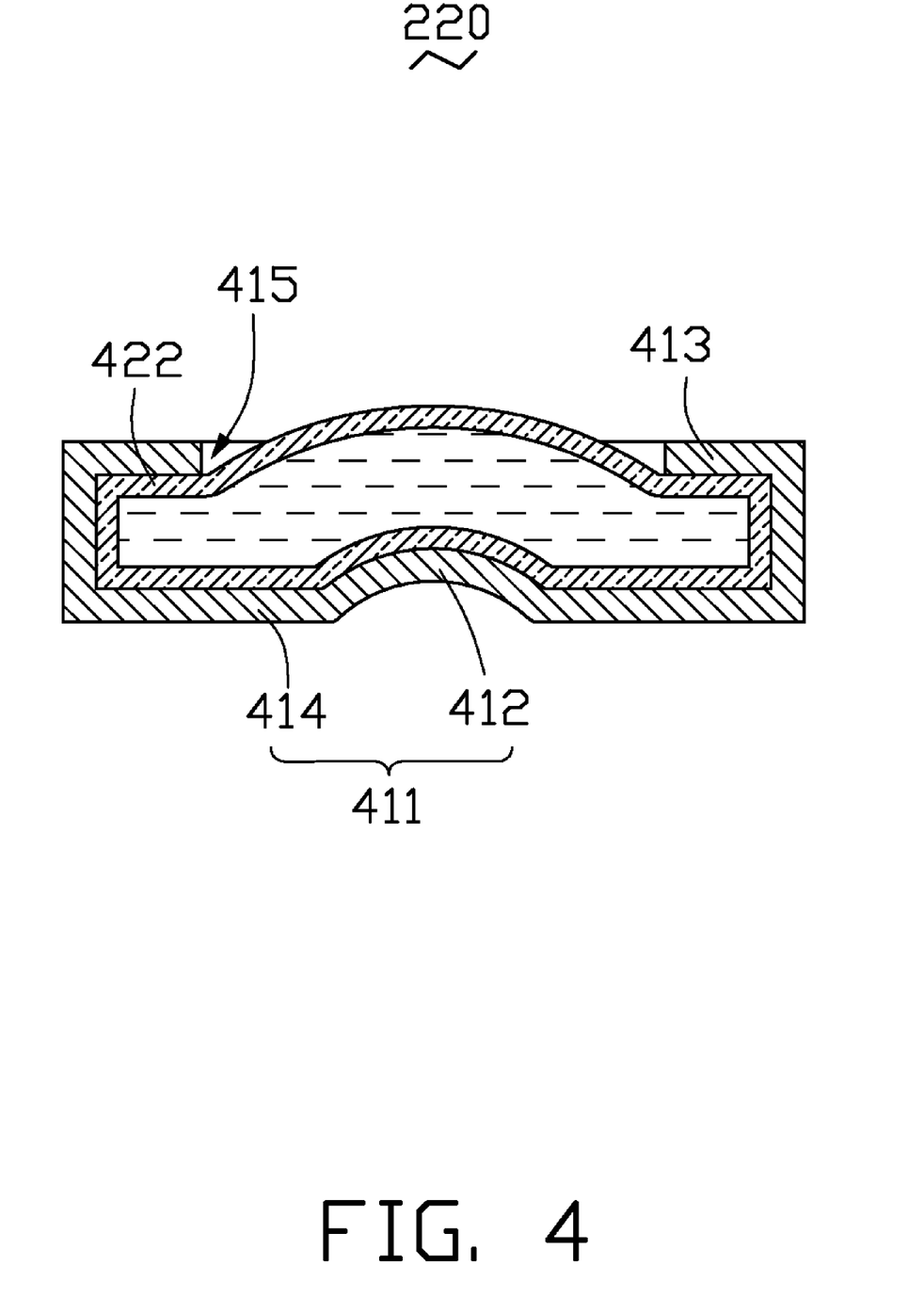
FIG. 4 is a cross-sectional view of a liquid lens in accordance with a third embodiment.

Referring to FIG. 4, a liquid lens 220 is provided in a third embodiment. Compared to the liquid lens 20, the bottom wall 411 includes an arc-shaped concave portion 412 aligned with the through opening 415 in the top wall 413. As such, a portion of the elastic shell 422 contacted with the concave portion 412 is arc-shaped, the liquid lens 220 is a convex-concave lens.

A lens module having a liquid lens will be described in detail fellow with taking an example of the liquid lens 20.

Figure 5:
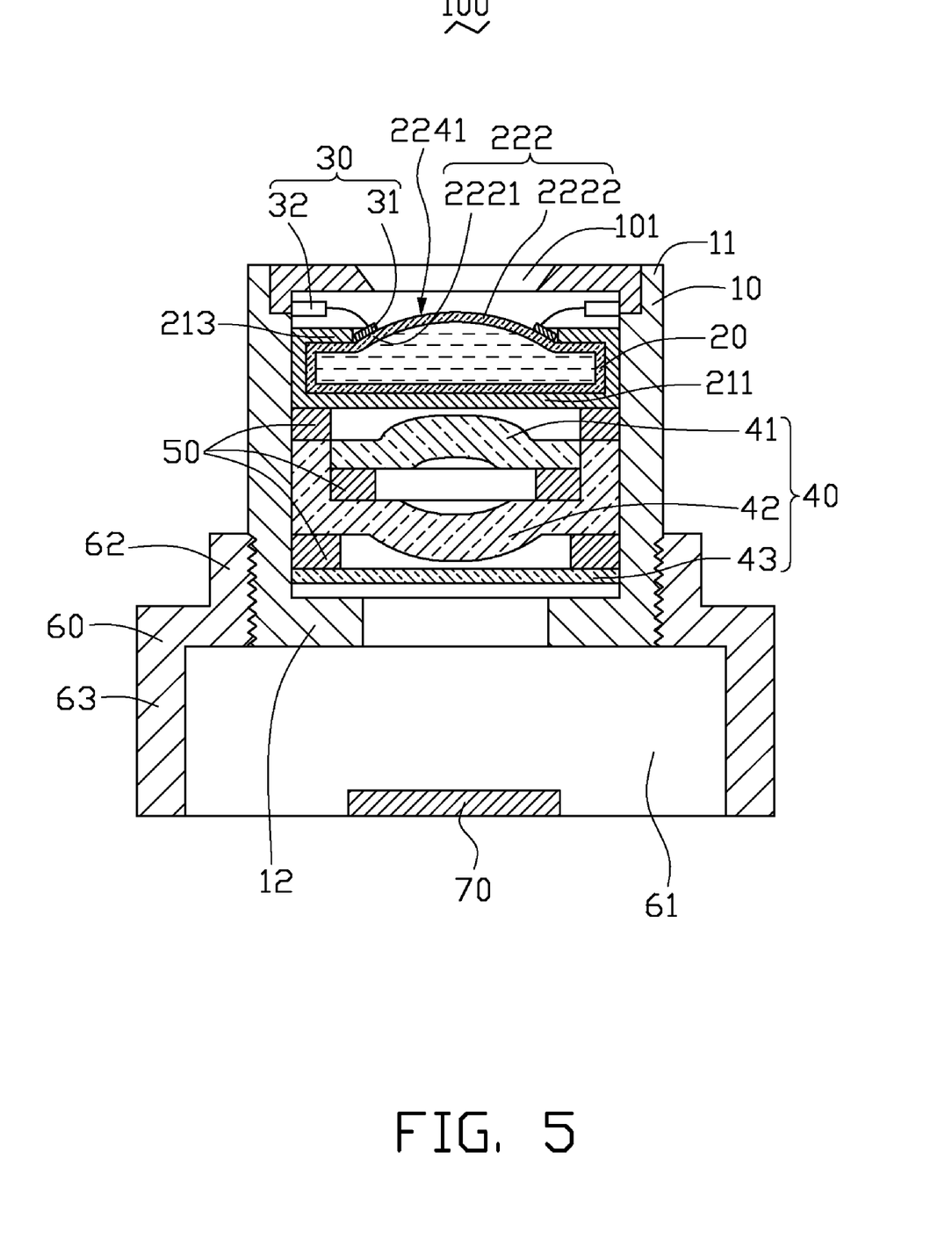
FIG. 5 is a cross-sectional view of a lens module including the liquid lens shown in FIG. 1 according to a first embodiment.

Referring to FIG. 5, a lens module 100 provided in a first exemplary embodiment includes a barrel 10, a liquid lens 20, a pressure applying means 30 electrically contacted with the liquid lens 20, a solid lens unit 40, a spacer 50, a holder 60 and an image sensor 70. The liquid lens 20, the solid lens unit 40 and the image sensor 70 are aligned in that order from the object side to the image side.

The barrel 10 is cylinder-shaped and is partially screwed in the holder 60. The barrel 10 is configured (i.e., structured and arranged) for receiving the liquid lens 20, the piezoelectric driver 30, the solid lens unit 40 and the spacer 50 therein. The barrel 10 includes a first end 11 and an opposite second end 12. The first end 11 defines an aperture 101 therein. The aperture 101 is configured for allowing light beams transmit therethrough into the liquid lens 20. The aperture 101 is coaxial to the barrel 10. The second end 12 is partially screwed into the holder 60. In addition, a transparent mask (not shown) can be placed in the aperture 101 to prevent impurity goes into the barrel 10 via the aperture 101.

Referring to FIGS. 1, 2 and 5, the outer convex portion 222 of the elastic shell 22 includes an intermediate portion 2221 and a periphery portion 2222. The periphery portion 2222 surrounds the intermediate portion 2221, and adjoins to the intermediate portion 2221. The intermediate portion 2221 is opposite to the aperture 101. Preferably, the intermediate portion 2221 and the aperture 101 have a same projection in the bottom wall 211. The central axis of the periphery portion 2222 and the central axis of the intermediate portion 2221 are essentially coaxial.

The pressure applying means 30 is configured for applying a pressure on the periphery portion 2221 when a focal length of the lens module 100 need be adjusted. In the present embodiment, the pressure applying means 30 is a piezoelectric driver, which includes a piezoelectric member 31 and a direct voltage supplier 32 electrically connected to the piezoelectric member 31.

The piezoelectric member 31 is attached on the periphery portion 2222 and adjacent to the top wall 213. The piezoelectric member 31 deforms if placed in an electrical filed. The piezoelectric member 31 can be a piezoelectric ceramic layer or a piezoelectric ceramic film. Pb-based lanthanum doped zirconate titanates (PZT, short for Pb(ZrTi)O$_3$) is known as high-sensitivity and easily-attached. Therefore, preferably, the piezoelectric member 31 is made of PZT.

The direct voltage supplier 32 is in electrical connection to an electrode (not shown) contacted with the piezoelectric member 31 and another electrode (not shown) contacted with the bottom wall 211. The direct voltage supplier 32 can be a DC/DC converter or an AC/DC converter, and is used to provide a direct voltage between the piezoelectric member 31 and the bottom wall 211. In detail, when the direct voltage supplier 32 supplies a predetermined direct voltage along a polarization direction of the piezoelectric member 31, the piezoelectric member 31 deforms and simultaneously provides a pressure to the periphery portion 2221, the periphery portion 2221 deforms and the intermediate portion 2222 deforms according to the pressure, and thereby a desired focal length is obtained. When the direct voltage supplier 32 is electrically disconnected, the shape of the piezoelectric member 31 restores, and the shape of the intermediate portion 2222 restores simultaneously. A deformation of the piezoelectric member 31 is in proportion to an electrical field intensity of the electrical, which is satisfied following formula: $S=dE$, wherein, $S$ is the deformation of the piezoelectric member 31, $d$ is a piezoelectric effection of the piezoelectric member 31, and $E$ is the electrical field intensity.

The solid lens group 40 includes a first lens 41, a second lens 42 and a third lens 43, which are aligned in the order that from the object side to the image side.

The first lens 41 and the second lens 42 are usually made of glass or plastic resin, and can be spheric lenses or aspheric lenses. The first lens 41 and the second lens 42 are fixed using a known joggled process or a typical agglutination method.

The third lens 43 is a filter, which is configured for transmitting light in the visible spectrum while blocking light in the infrared spectrum, and is used to protect the image sensor 70 from interference from infrared radiation. The third lens 43 can be an infra-red cut filter or an infra-red/ultraviolet radiation cut filter. In addition, the lens group 40 may not include the third lens 43.

The spacer 50 is configured for separating the liquid lens 20 and the first lens 41, the first lens 41 and the second lens 42, the second lens 42 and the third lens 43.

The holder 60 defines a cavity 61 therein. The cavity 61 is configured for partially receiving the barrel 10 and the image sensor 70 therein. The holder 60 includes a first end portion 62 and an opposite second end portion 63. The first end portion 62 is coupled with the second end 12 of the barrel 10 so that the holder 60 engages with the barrel 10. For example, the second end 12 of the barrel 10 is partially screwed into the first end portion 62 of the holder 60.

The image sensor 70 is received in the holder 60 and is disposed at the second end portion 63 of the holder 60. The optical components such as the solid lenses unit 40 and the liquid lens 20 in the barrel 100 optically communicate with the image sensor 70 to capture images. The image sensor 70 can be a charge coupled device (CCD) or a complementary metal oxide semiconductor (CMOS).

In addition, the lens module 100 can not have the solid lens group 40. In the present embodiment, the focal length of the lens module 100 is varied depend on whether the piezoelectric member 31 is in a predetermined electrical field which has a predetermined intensity. It is not necessary to continuously apply a voltage, thus the lens module 100 is lower energy consumed.

Figure 6:
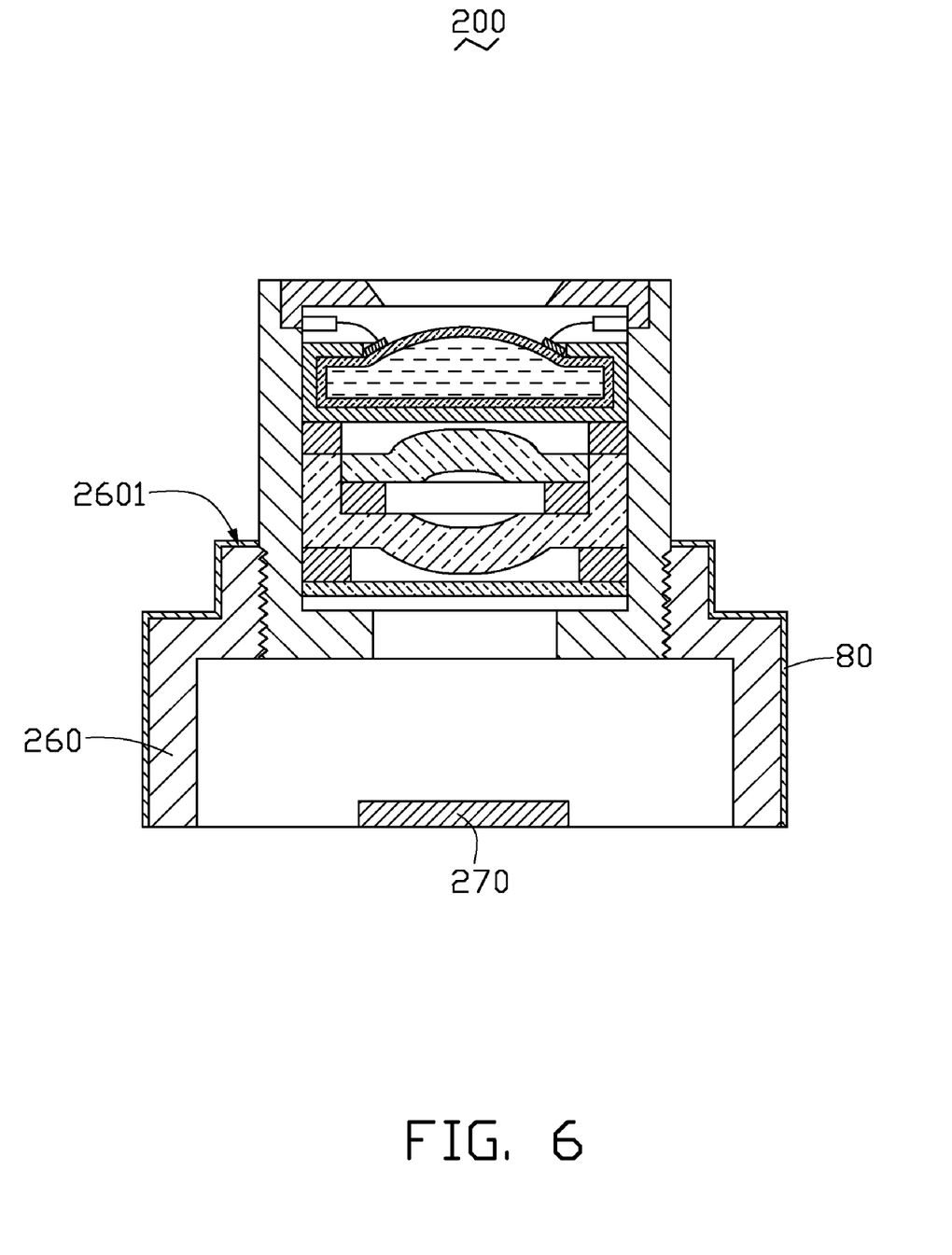
FIG. 6 is a cross-sectional view of a lens module including the liquid lens shown in FIG. 1 according to a second embodiment.

Referring to FIG. 6, a lens module 200 having the liquid lens is provided in a second embodiment. Compared with the lens module 100, the lens module 200 further includes an electromagnetic shielding coating 80 formed on an outer surface 2601 of the holder 260. The electromagnetic shielding coating 80 is configured for protecting the image sensor 270 from outside electromagnetic influence, thereby improving an imaging quality. The electromagnetic shielding coating 80 is comprised of a polymeric matrix and a number of carbon nanotubes dispersed in the polymeric matrix. The polymeric matrix can be selected from a group consisting of a thermoplastic resin, a thermosetting resin, an ultraviolet curable resin or any combination thereof. For example, the thermoplastic resin can be an acrylic acid resin, the thermosetting resin can be an epoxy resin, and the ultraviolet curable resin can be a silicon resin. The carbon nanotubes can be single-wall carbon nanotubes or multiple-wall carbon nanotubes.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A liquid lens module, comprising:
an enclosure having a top wall, a through opening defined in the top wall, and an invariable inner space, the through opening communicating with the inner space;
an elastic shell received in the enclosure, the elastic shell comprising an inner portion fittingly received in the inner space and an outer convex portion protruding from the top wall through the through opening;
a light pervious liquid, the elastic shell being filled with the light pervious liquid; and
a pressure applying means for applying a pressure onto a periphery of the convex portion to change a curvature of the convex portion thereby adjusting a focus length of the liquid lens module.

2. The lens module as claimed in claim 1, wherein the pressure applying means includes a piezoelectric driver.

3. The lens module as claimed in claim 1, wherein the pressure applying means includes a piezoelectric member and a direct voltage supplier, the piezoelectric member is contacted with the periphery of the convex portion, the direct voltage supplier is electrically connected with the piezoelectric member, and is configured for supplying the piezoelectric member a direct electrical field along a polarization direction of the piezoelectric member, such that the piezoelectric member deforms and presses the periphery of the convex portion.

4. The lens module as claimed in claim 1, wherein the enclosure further comprises a flat bottom wall opposite to the top wall.

5. The lens module as claimed in claim 4, wherein the bottom wall defines a through opening aligned with the through opening in the top wall, the elastic shell including another outer convex portion protruding from the bottom wall via the through opening in the bottom wall.

6. The lens module as claimed in claim 4, wherein the bottom wall comprises a concave portion aligned with the through opening in the top wall.

7. The lens module as claimed in claim 1, wherein the light pervious liquid is selected from the group consisting of sodium chloride, sodium vitriol, silicon oil solution and bromododecane solution.

8. The lens module as claimed in claim 1, wherein the elastic shell is comprised of a material selected from the group consisting of indium tin oxide, zinc oxide, tin oxide, indium hybrid monoxide, tin hybrid argent indium oxide and zinc hybrid.

9. The lens module as claimed in claim 1, further comprising a barrel and a holder, an outer surface of the holder covered with an electromagnetic shielding coating.

10. A liquid lens, comprising:
an enclosure having a top wall, an through opening defined in the top wall thereof, and a bottom wall opposite to the top wall, the bottom wall being flat and comprising a concave portion aligned with the through opening;
an elastic shell received in the enclosure, the elastic shell comprising an inner portion received in the enclosure and an outer convex portion protruding from the top wall through the through opening; and
a light pervious liquid, the elastic shell being filled with the light pervious liquid.

11. The liquid lens as claimed in claim 10, wherein the elastic shell is comprised of material selected from the group consisting of indium tin oxide, zinc oxide, tin oxide, indium hybrid monoxide, tin hybrid argent indium oxide and zinc hybrid.

12. A lens module, comprising:
an enclosure having a top wall and a through opening defined in the top wall thereof;
an elastic shell received in the enclosure, the elastic shell comprising an inner portion received in the enclosure and an outer convex portion protruding from the top wall through the through opening;
a light pervious liquid, the elastic shell being filled with the light pervious liquid; and
a pressure applying means for applying a pressure onto a periphery of the convex portion to change a curvature of the convex portion thereby adjusting a focus length of the liquid lens module, the pressure applying means comprising a piezoelectric member and a direct voltage supplier, the piezoelectric member contacting with the periphery of the convex portion, the direct voltage supplier being electrically connected with the piezoelectric member and configured for supplying the piezoelectric member a direct electrical field along a polarization direction of the piezoelectric member, such that the piezoelectric member deforms and presses the periphery portion.

13. The lens module as claimed in claim 12, the enclosure further comprising a flat bottom wall opposite to the top wall, the bottom wall comprising a concave portion aligned with the through opening in the top wall.

14. The lens module as claimed in claim 12, wherein the elastic shell is comprised of a material selected from the group consisting of indium tin oxide, zinc oxide, tin oxide, indium hybrid monoxide, tin hybrid argent indium oxide and zinc hybrid.

15. The lens module as claimed in claim 12, further comprising a barrel and a holder, an outer surface of the holder being covered with an electromagnetic shielding coating.

* * * * *